US006932214B1

(12) United States Patent  (10) Patent No.:  US 6,932,214 B1
Zimet  (45) Date of Patent:  Aug. 23, 2005

(54) DISPOSABLE CAR FAST FOOD BOX

(76) Inventor: Dave Zimet, 9824 Grande Verde Way Apt. 907, Boca Raton, FL (US) 33248

( * ) Notice: Subject to any disclaimer, the term of this patent is extended or adjusted under 35 U.S.C. 154(b) by 329 days.

(21) Appl. No.: 10/288,304

(22) Filed: Nov. 6, 2002

(51) Int. Cl.[7] .................. B65D 77/00; B65D 69/00; B65D 5/46; B60R 7/00
(52) U.S. Cl. ............. 206/217; 206/549; 229/117.11; 224/275
(58) Field of Search ................ 206/217, 541, 206/549, 562, 563, 564; 220/737, 212.5, 220/754, 763, 768; 229/117.22, 117.11, 117.09; 224/275

(56) References Cited

U.S. PATENT DOCUMENTS

| 577,198 | A | * | 2/1897 | Lackey | 229/117.02 |
|---|---|---|---|---|---|
| 593,489 | A | * | 11/1897 | Noland | 229/125.22 |
| 1,772,009 | A | * | 8/1930 | Lackey | 294/149 |
| 2,264,208 | A | * | 11/1941 | Inman | 229/117.11 |
| 2,719,655 | A | * | 10/1955 | Hellebusch | 222/572 |
| 2,741,420 | A | * | 4/1956 | Bodard | 229/117.11 |
| 2,767,901 | A | * | 10/1956 | Buttery | 229/117.12 |
| 2,769,413 | A | * | 11/1956 | Bodard | 112/470.21 |
| 3,357,623 | A | * | 12/1967 | Wommelsdorf | 229/402 |
| 3,373,917 | A | * | 3/1968 | Cox | 229/117.27 |
| 3,557,516 | A | * | 1/1971 | Brandt | 53/397 |
| 4,498,619 | A | * | 2/1985 | Roccaforte | 229/117.13 |
| 5,429,231 | A | | 7/1995 | McSpadden | |
| 5,511,755 | A | | 4/1996 | Spykerman | |
| 5,690,036 | A | | 11/1997 | Hasegawa | |
| 5,788,081 | A | * | 8/1998 | Bates | 206/562 |
| 5,947,011 | A | | 9/1999 | Xu | |
| 6,070,844 | A | | 6/2000 | Salenbauch et al. | |
| 6,305,532 | B1 | | 10/2001 | Overkamp | |
| 6,401,927 | B1 | * | 6/2002 | Sorensen et al. | 206/562 |
| 6,439,388 | B1 | * | 8/2002 | Lerner | 206/562 |
| 6,568,586 | B1 | * | 5/2003 | VanEsley et al. | 229/120.18 |
| 6,722,540 | B2 | * | 4/2004 | Ling | 224/275 |
| 2003/0160076 | A1 | * | 8/2003 | Lofaro | 224/275 |

FOREIGN PATENT DOCUMENTS

JP            406156478 A  *  6/1994

* cited by examiner

Primary Examiner—Mickey Yu
Assistant Examiner—Faye Francis
(74) Attorney, Agent, or Firm—C. J. Husar, Esq.

(57) ABSTRACT

A disposable fast food box/container with a pair of semi-circular handles for convenient carrying and a drink holder therein. The handles include strap portions that are attached to the lid that allow a vehicle seat belt to be passed thereunder and serve to hold the lid in an open position close to the chest of the user. The lid includes a pair of side flaps that cooperate with the lid portion for directing any crumbs generated during eating into the box/container directly below thus eliminating the usual mess that occurs during eating in a vehicle. The drink holder includes a conical flexible wall portion that becomes inverted when engaged by the base of a drink container bringing the conical flexible wall into engagement with conical outer surface of the drink container to stabilize drink container therein.

13 Claims, 2 Drawing Sheets

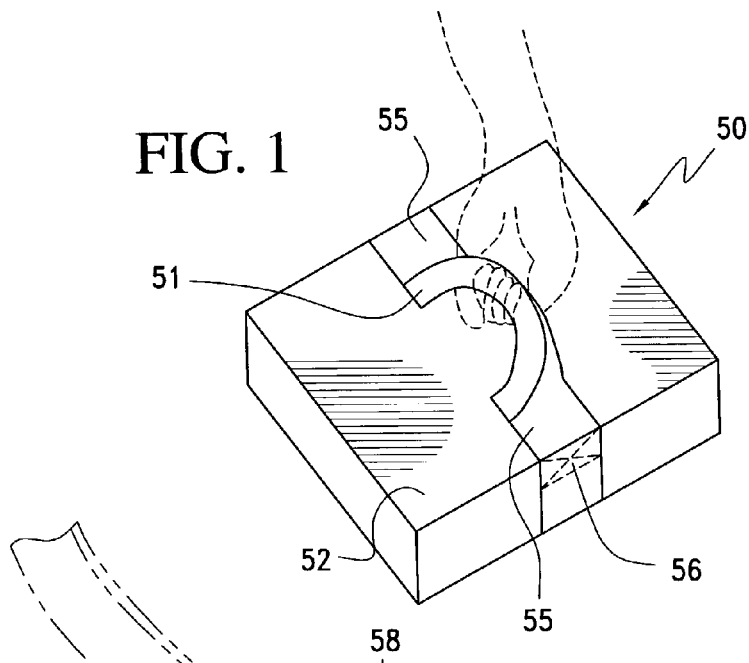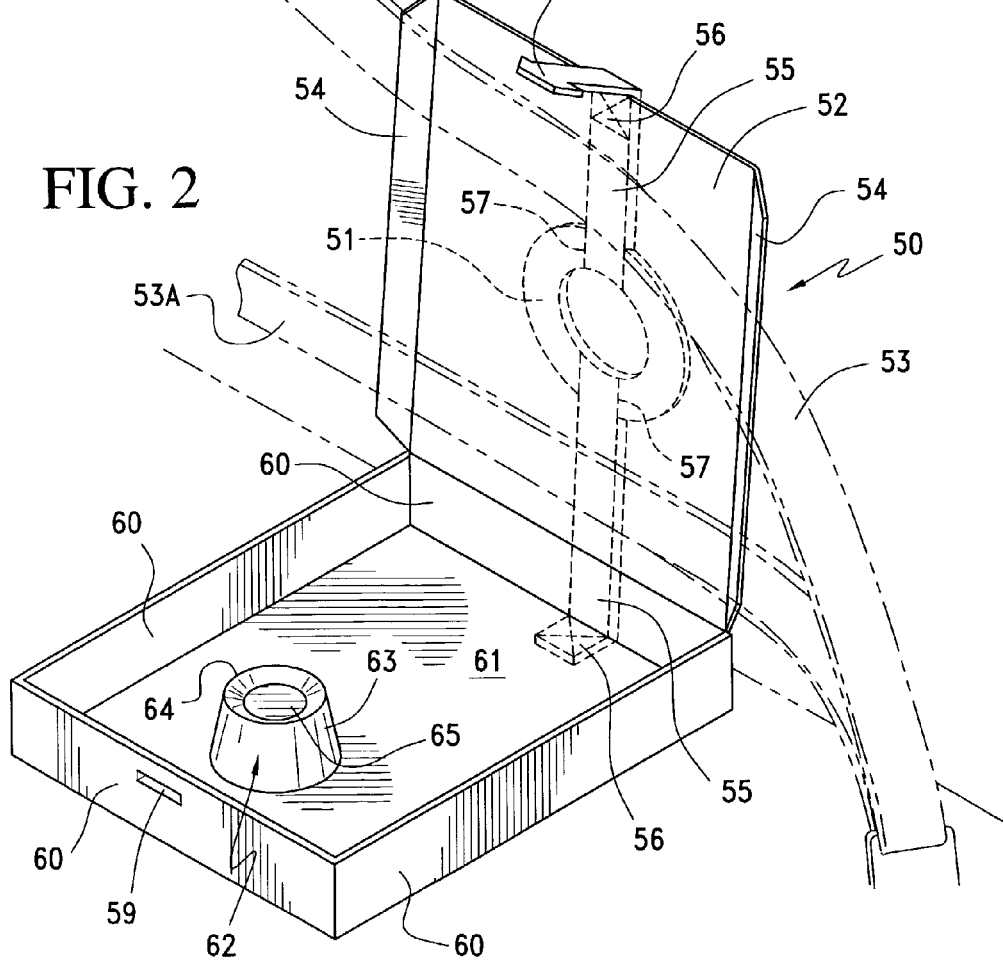

DISPOSABLE CAR FAST FOOD BOX

BACKGROUND OF THE INVENTION

The present invention relates to a fast food container and more specifically it relates to a fast food container that is utilized by an automobile occupant, i.e., either the driver or a passenger or both.

Due to the fast paced life style that we are all experiencing in today's modern world, it has become common practice for one to get a bite to eat while "on the go". Millions of times each day this practice takes place while we are rushing from one place to another, doing multiple errands such as stopping at the cleaners, grocery store shopping, taking the kids to sporting activities, dropping them off for music lessons, picking them and rushing back home to get ready for another day of similar activities. These are a few of the many varied activities that an average family experiences on any given day. All of these situations leave little time for the old fashioned practice where the entire family would sit down at the kitchen table and join in conversation while enjoying their meals and discuss the events of the day. The aforementioned routine is not limited to families with children, these are common everyday experiences that we all go through regardless of one's marital status.

In view of the above noted conditions, there has been a vast increase the number of so called fast food restaurants with drive-thru lanes to expedite the process. Additionally, the automobile industry has also recognized this trend and as a result, present day vehicles are all equipped with cup holders mounted on the inside panels of the door as an integral part of the arm rest. Also, there are dash and console mountings for drink holders and in some situations, the rear of the vehicle is provided with retractable planar surfaces that can serve as a tray for accommodating food while on the move. Although these accommodations are a step toward solving the problem of drinking and eating while on the move in a motor vehicle, they fall short of their target. In most instances, these drink holders are inconveniently located out of the reach of the occupants, especially so, when the seat belts are fastened. As a direct result of this situation, occupants of the vehicle have frequently resorted to releasing the seat belts to provide more mobility and ease of movement during eating or snacking, thus contributing to an unsafe, and in some instances, an illegal motoring condition in violation of some state seat belt laws.

DISCUSSION OF THE PRIOR ART

A search of the U.S. Patent Office files in the appropriate Classes and subclasses revealed the following prior art patents:

U.S. Pat. No. 5,429,231—issued to McSpadden on Jul. 4, 1995—discloses a portable food tray with cup holder and several compartments for food.

U.S. Pat. No. 5,511,755—issued to Spykerman on Apr. 30, 1996—discloses a container holder for a vehicle that includes a resiliently flex over-center side portion forming a holder for a first sized container and a second position forming a container holder for a second sized container.

U.S. Pat. No. 5,690,036—issued to Hasegawa on Nov. 25, 1997—discloses a retractable tray with a flexible cup holder mounted on the rear of a vehicle seat.

U.S. Pat. No. 5,947,011—issued to Xu on Sep. 7, 1999—discloses a food plate with a thumb and beverage aperture for gripping and holding the tray with one hand.

U.S. Pat. No. 6,070,844—issued to Salenbach et al on Jun. 6, 2000—discloses a variable size vehicle container holder that is adjustable to accommodate beverage containers of a variety of sizes.

U.S. Pat. No. 6,305,532—issued to Overkamp on Oct. 23, 20001—discloses a travel tray with a raised lip forming the tray and a centrally mounted opening for accommodating a drinking cup therein.

A review of the above cited art reveals that none of these trays include any accommodation wherein the seat bell cooperates with a carrying handle attached to the lid to hold it in a raised condition while in use. Further, none of these patents include a lid, which when raised to its open position, serves to direct any crumbs or spillage directly into the tray below. Also, the cup holder of the instant invention will accommodate cups/containers of different sizes and provide stability to the cup/containers when it is inserted into the holder and pushed down to its operative position.

SUMMARY OF THE INVENTION

Applicant has provided a disposable fast food container/tray that includes a carrying handle that is attached to its lid and used for caring the container with food therein and is subsequently used in such a manner to allow the seat belt of the vehicle to be placed thereunder to hold the tray in place and also hold the lid in a raised condition during eating whereby any crumbs or spillage is directed into the tray below. Centrally located in the forward portion of the container/tray is a drink holder with a raised conical portion extending above the base of the tray and having a bottom therein. In use, the user inserts the lower most portion of the drink container into engagement with the bottom of the raised portion and pushes downward with the sides of the raised portion turning inward and downward to the point where the formerly raised portion is now inverted inwardly into engagement with the sides of the container to securely hold it in place.

OBJECTS OF THE INVENTION

An object of the invention is to provide a disposable fast food box/container that also serves as a tray for holding the food and drink while eating in a vehicle.

Another object of the invention is to provide a fast food box/container that is provided with carrying handles.

A further object of the invention is to provide a fast food box/container that cooperates with the vehicle seat belt to hold the tray in place while in the vehicle.

Yet another object of the invention is to provide a fast food box/container that serves as an eating tray and wherein the lid is held in a raised position against the user's chest to direct any crumbs or spillage into the tray below without making a mess in the vehicle.

A still further object of the invention is to provide a fast food box/container that also includes a drink holder that allows the drink container to partially project through the bottom of the tray between the user's legs where the drink container is stabilized and ready for use.

These and other objects of the invention will become more apparent hereinafter. The instant invention will now be described with particular reference to the accompanying drawings wherein like reference characters designate the corresponding parts throughout the several views.

BRIEF DESCRIPTION OF THE DRAWINGS

FIG. 1 is a perspective view illustrating the fast food box/container in its closed condition with the carrying handles in their raised postion.

FIG. 2 is an enlarged perspective view of the fast food box/container in its open position showing the vehicle seat belt in phantom supporting the raised lid.

DETAILED DESCRIPTION OF THE DRAWINGS

Figure 3:
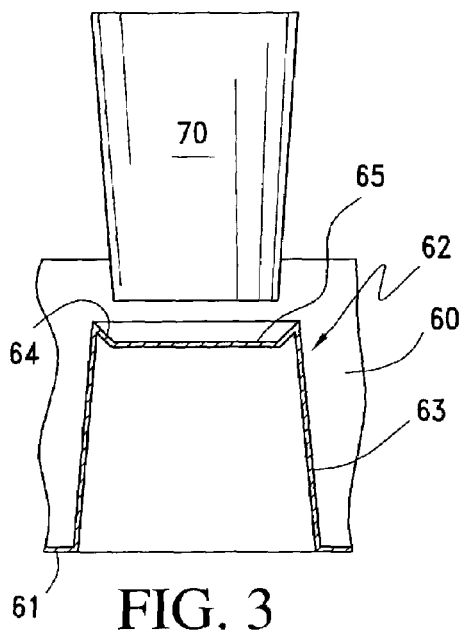
FIG. 3 is a partial sectional view showing the drink container and its relation to the drink holder just prior to engagement therewith.

Referring now to FIG. 1, there is shown a perspective view of the novel box/container 50 in its closed condition with handles 51 in their raised position ready for grasping by a hand shown in phantom.

FIG. 2 is another perspective view of box/container 50, which is preferably made of recyclable paper, with its lid 52 in its raised position illustrating the interior of box/container 50. As shown seat belt straps 53, 53A have been passed underneath handles 51 and serves to hold lid 52 in its raised position. Lid 52 includes a pair of side flaps 54 that cooperate with lid 52 to direct any crumbs of food produced while eating into the open box/container 50 below. As illustrated, handles 51, comprising a pair of handle grips that are semi-circular and include strap extensions 55 that extend over the outer surface of lid 52 and may include adhesive or other suitable attachment means at 56 for attaching handles 51 to lid 52 and bottom of 61 of container 50. Additionally, handles 55 are provided with score lines 57 to allow for easy bending of handles 51 relative to lid 52 when used in the carrying mode. At the forwardmost end of attachment strap 55 is latching tab 58 that is received in slot 59 for securing lid 52 to box/container 50 to allow carrying thereof. After lid 52 is opened, tab 58 can be torn off or bent backward to remove any possibility of interference with falling crumbs when in use. In addition to lid 52, box/container 50 comprises four upstanding walls 60 and a base portion 61 with a forward, centrally located drink holder 62 projecting upwardly from base 61. As shown herein, drink holder 62 includes a flexible conical wall portion 63 with an inwardly turned portion 64 followed by a flat base portion 65 that is engaged by a drinking container 70 when in use.

Figure 4:
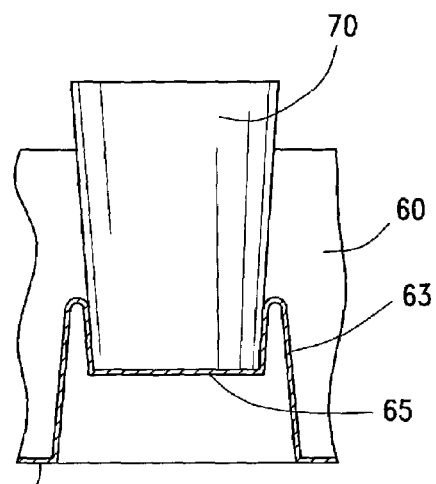
FIG. 4 is another partial sectional view showing the drink container in engagement with the base of the drink holder and a downward force has been applied to begin the inversion of the drink holder sidewall.
Figure 5:
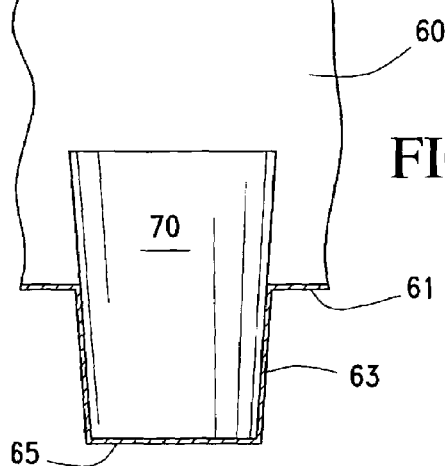
FIG. 5 is another partial sectional view showing the drink container fully inserted into the drink holder with the lower portion of the drink holder and container projecting below the base of the container tray.
Figure 6:
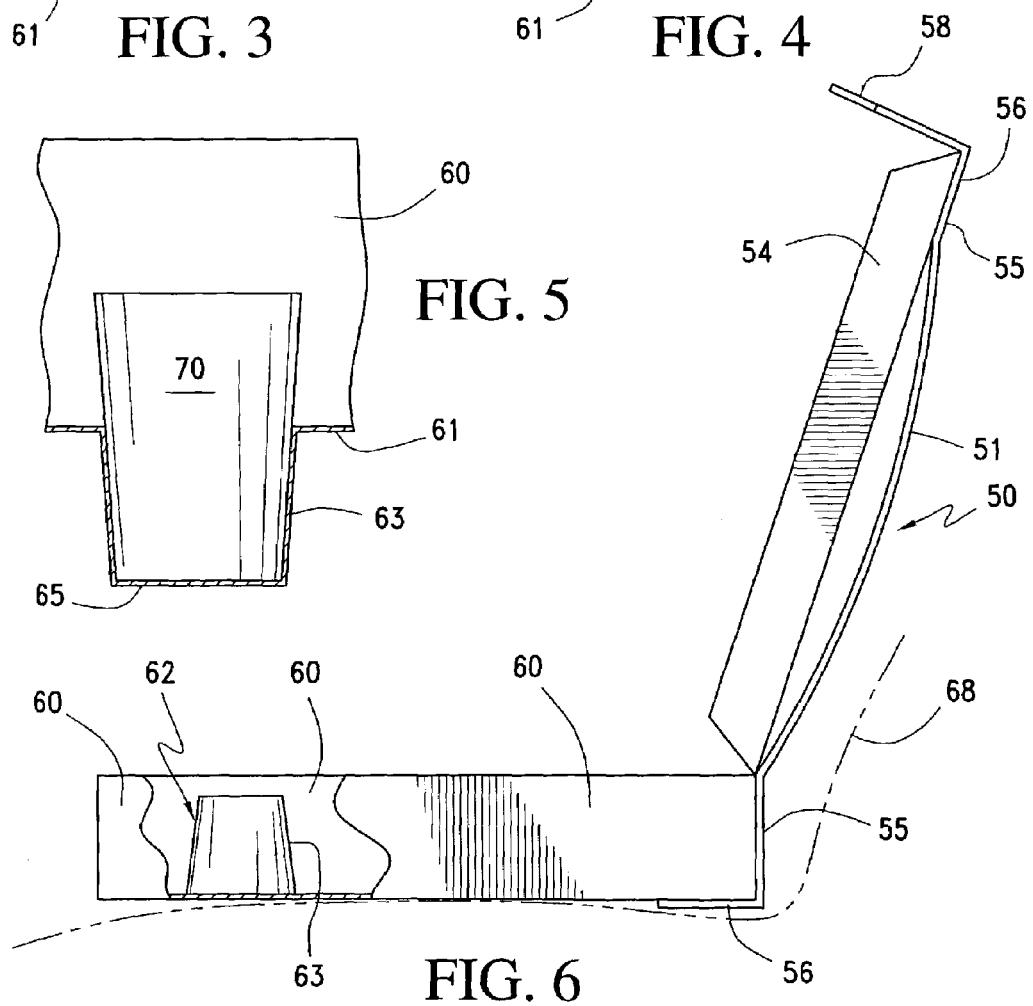
FIG. 6 is a perspective view of the fast food box/container with the lid in its open position and a portion of a person shown in dashed lines prior to insertion of the vehicle seat belt.

Referring now to FIGS. 3–5, there is shown the sequence of steps encountered when a drink container 70 is brought into engagement with base portion 65 of drink holder 62. FIG. 3 is a partial sectional view illustrating drink holder 62 with a drink container 70 just prior to engagement by drink container 70. As indicated above, drink holder 62 comprises a flexible conical wall portion 63 with an inwardly turned portion 64 and a flat base portion 65. FIG. 4 illustrates drink container 70 engaged with base portion 65 and with a downward force applied to drink container 70, flexible conical wall portion 63 rolls inwardly and downwardly as shown, bringing the inner surface of flexible conical wall portion 63 into engagement with the conical outer surface of drink container 70. FIG. 5 illustrates the resting position of drink container 70 after continued force has been applied to drink container 70. As illustrated, flexible conical wall 63 has become inverted and fully engages the outer conical surface of drink container 70 thus providing stability thereto.

FIG. 5 is a side view with a portion of side wall 60 broken away to illustrate the relation of drink holder 62 to remainder of box/container 50 prior to insertion of a drink container 70 therein. A partial outline of a person is illustrated in phantom lines 68 to show the position of box/container 50 when in use.

It appears that a review of the novel features included in the subject disposable fast food box/container would be helpful at this time. Firstly, applicant has provided a novel fast food box/container 50 that includes carrying handles 51 that are subsequently used to retain the lid 52 in an open position while eating. The lid 52 includes a pair of side flaps 54 that serve to direct any crumbs inwardly and downwardly into the box/container below and eliminating the usual mess encountered while eating in a vehicle. Secondly, a novel drink holder 62 is provided to provide easy access to the drink and also provide stability of the drink while supported therein. Thus it can be seen that applicant has made significant contributions to the fast food box/container art and significantly contributes to a satisfaction of the needs of persons on-the-go.

While the invention has been described in its preferred embodiment, it is to be understood that the words which have been used are words of description rather than words of limitation and that changes may be made within the purview of the appended claims without departing from the full scope or spirit of the invention.

Having thus described my invention, I claim:

1. A combination fast food container and eating tray for carrying food therein and subsequently eating the food while in a motor vehicle comprising:

a rectangular container having four sides, a bottom forming a tray while eating and hinged lid means including a lid;

said lid including a pair of side flaps and handle means secured thereto for carrying the contents of said container;

said handle means comprising a pair of handle grips centrally located on the top of said lid;

said handle grips including a pair of oppositely extending strap portions that are fastened adjacent their terminal ends to the bottom of said container and lid respectively;

one of said pair of oppositely extending straps that is attached to said lid includes a forward extending portion that serves as a latching tab for securing the lid to said container when carrying said container;

an integral flexible drink holder projecting upwardly from said bottom for receiving a drink container therein; whereby a seat belt may be passed between said handle means and said lid and said flexible drink holder may be inverted and securely retain said drink container therein.

2. A combination fast food container and eating tray as defined in claim 1 wherein the forward side of said container includes a slot therein for receiving said latching tab for holding said lid of said container in its closed position for carrying.

3. A combination fast food container and eating tray as defined in claim 1 wherein said lid and said side flaps direct any crumbs into the tray directly below when eating.

4. A combination fast food container and eating tray as defined in claim 1 wherein said handle grips extend outwardly from said pair of oppositely extending straps and includes a pair of crease lines for easy raising of said handle grips relative to said container for carrying.

5. A combination fast food container and eating tray as defined in claim 1 wherein said handle grips and said straps allow for the passing of a seat belt harness between said handle grips and the upper surface of said lid prior to latching and serve to hold the tray secure and keep the lid in a raised condition for eating.

6. A combination fast food container and eating tray as defined in claim 1 wherein the location of said drink holder is conveniently located forward and centrally in said fast food container such that said drink container when inserted therein is positioned between the legs of the user.

7. A combination fast food container and eating tray as defined in claim 1 wherein said flexible drink holder includes a flexible truncated cone-like wall portion followed by an inward and downwardly turned lip portion that connects to a central base therein;

upon engagement of said central base portion with the bottom of said drink container and application of a downward forces said flexible truncated cone-like wall inverts and passes through said bottom of said fast food container with said flexible wall in close engagement with the outer conical surface of said drink container to releasably stabilize and securely hold said drink container therein.

8. A combination fast food container and eating tray for carrying food therein comprising:

a rectangular container having two side walls, a forward wall and a rear wall with a bottom connected to said four walls;

a lid operably connected to said rear wall and having a pair of side flaps extending therefrom;

handle means operably connected to said lid at one end with the opposite end connected to said bottom of said container and including a latching tab at the forward end of said lid;

a slot in said forward wall for receiving said latching tab to securely hold said lid in a closed condition when carrying food therein.

9. A combination fast food container and eating tray as defined in claim 8 wherein said handle means comprises a pair of handle grips that are attached to strap means that securely hold said handle grips to said container.

10. A combination fast food container and eating tray as defined in claim 9 wherein said strap means comprises an elongated strap with handle grips forming semi-circular handles.

11. A combination fast food container and eating tray as defined in claim 10 wherein said elongated strap means is adhesively attached to said lid and container bottom near opposite ends thereof.

12. A combination fast food container and eating tray as defined in claim 10 wherein the point of attachment of said handle grips to said strap means includes a crease line for ease in raising said handle grips into their operative position.

13. A combination fast food container and eating tray as defined in claim 11 wherein said fast food container and eating tray is made of disposable, recyclable paper.

\* \* \* \* \*